United States Patent Office 3,526,663
Patented Sept. 1, 1970

3,526,663
ACETOACETAMIDO COUPLING COMPOUNDS
David P. Habib, 282 Forest Glen St., West Springfield, Mass. 01089, and George R. Hodgins, 666 Amherst Road, South Hadley, Mass. 01075
No Drawing. Original application Mar. 31, 1964, Ser. No. 356,024, now Patent No. 3,387,977, dated June 11, 1968. Divided and this application Apr. 10, 1968, Ser. No. 720,387
Int. Cl. C07c 103/42
U.S. Cl. 260—561    4 Claims

ABSTRACT OF THE DISCLOSURE

Acetoacet derivatives of aliphatic amines of the following general structure:

in which $n$ is any integer from 1 to 2 and X is

wherein R is H or an alkyl group containing 1 to 4 carbon atoms. The acetoacet compounds of the present invention which may be employed as coupling components with diazonium compounds in the manufacture of light sensitive diazo coating compositions are generally synthesized by the reaction of a selected amine with diketene or acetoacetic ester.

---

This application is a division of our copending application Ser. No. 356,024, filed Mar. 31, 1964, now U.S. Pat. No. 3,387,977, dated June 11, 1968.

BACKGROUND

As is well known, acetoacetamido derivatives of aromatic amines may be used to obtain yellow and orange azo dyes by reaction with suitable diazonium salts. For example, an orange dye may be produced by reaction of acetoacet-o-toluidide with 4-diethylamino-2-ethoxy-benzenediazonium chloride. Yellow may be produced by reaction of acetoacetanilide with 4 ethylamino-3-methyl-benzenediazonium chloride. Both these couplers are acetoacetamido derivatives of aromatic amines. Various other types of couplers and diazos for producing different colors are described in U.S. Pats. Nos. 1,989,065, 2,494,-906; 2,537,106; 2,537,919 and 3,069,268.

Since acetoactamido derivatives of aromatic amines are characterized by high coupling activity with diazonium compounds, even in the presence of common stabilizers their use is limited, because diazo-sensitized materials in which they are used exhibit shelf life (i.e. tendency to pre-couple). Moreover, the acetoacetamido couplers heretofore available are unsuitable for formulating a good neutral black color. Part of the reason for the poor formulating quality of the aromatic acetoacetamides is the large difference between their coupling activity and that of the blue color-formers used in conjunction with them to obtain a black azo dye.

Attempts have been made to circumvent the disadvantages of poor shelf life and high coupling activity through the use of a partial replacement of this coupler class by a sepia color-former (e.g., U.S. Pat. No. 2,537,919). The results, however, have not been entirely satisfactory.

Although the use of the acetoacet derivatives of aliphatic and heterocyclic amines was claimed to give acetoacet couplers improved shelf life and formulating qualities (e.g., U.S. Pat. No. 2,537,106), the shelf life of diazo blackline products formulated with the coupler classes described therein is still less than satisfactory. The problem of providing acetoacetamido couplers having both good formulating quality and shelf life remained.

It is the principal object of this invention to provide novel acetoacet compounds.

It is another object of this invention to provide improved couplers for use in the diazotype process.

It is another object of this invention to provide novel acetacet couplers having markedly better shelf life in diazotype formulations than those heretofore known.

It is a further object of this invention to provide improved diazo formulations for neutral blackline materials having prolonged shelf life with minimum background discoloration.

We have found that compounds represented by the following general structure exhibit improved shelf life and produce neutral black shades, when used in conjunction with certain blue color-formers in a diazotype formulation.

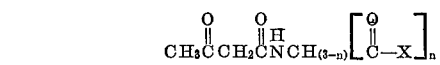

in which $n$ is any integer from 1–2; and X is

where R is H or an alkyl group containing 1 to 4 carbon atoms.

Examples of acetoacet derivatives of aliphatic amines covered by this invention are: acetoacetamido acetamide, acetoacetamido propanediamide, and acetoacetamido diethylacetamide.

It has been found that acetoacetamide derivatives of aliphatic amines containing the group

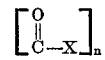

where X is

have improved shelf life and slower coupling activity, closely resembling that of the blue color-formers. The yellow and black-line diazotype formulations embodying this invention indicate that these formulations have excellent shelf life and the blackline prints exhibit stability and greater resistance to background yellowing.

Apparently, the presence of the

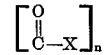

substituent effectively lowers the coupling activity of acetoacet couplers such that during shelf aging they have approximately the same coupling activity as those couplers normally used in blue and sepia formulations of blockline products. Thus shelf stability is greatly enhanced.

Acetoacet compounds embodying this invention may be synthesized by the reaction of a selected amine with diketene or acetoacetic ester. The following examples are illustrative of the method of synthesizing the type of acetoacet couplers of this invention.

Example I

Aminoacetamide (3.7 g.), was slurried in a solution of 60 ml. of acetone and 5 drops of pyridine, and cooled in a Dry Ice bath. Diketene (6.98 g.), was then added all at once. The temperature rose rapidly. After the initial exothermic reaction had subsided, external cooling was removed and the temperature was allowed to rise to 30–45° C. A heavy white precipitate formed. After cooling, filtering, and washing with acetone 7.8 g. of 2-acetoacetamide acetamide having a melting point of 160–161° C. were recovered. This compound, verified by infra-red spectrum analysis, may be represented by the following chemical structure:

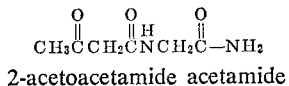

2-acetoacetamide acetamide

Example II

N,N diethyl-2 amino acetamide·HCl (4.5 g.) were dissolved in 25 ml. of methanol and 1.44 g. of sodium methylate were added. After a few minutes stirring, the precipitated salt was removed by filtration.

Acetone (25 ml.), and 3 drops of pyridine were then added. Diketene, 2.55 g. was added dropwise at ambient temperatures. The solvents were removed in vacuo and a light amber oil formed weighing 5 g. This compound, checked by infra-red spectrum analysis, may be represented by the following formula:

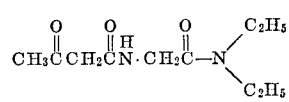

2-acetoacetamido N',N' diethylacetamide

Example III 3 g. of 2-amino malonamide were mixed with 50 ml. of acetone and 5 drops of pyridine. The mixture was cooled to 0° C. and 8.2 g. of diketene in drops were added. The temperature was maintained at 0° C. with a cooling bath. After the addition of diketene had been completed, the mixture was heated to reflux for 30 minutes. The mixture was cooled to 20° C. and a white precipitate formed. After filtering and drying, 3.7 g. of 2-acetoacetamido propanediamide were recovered having a melting point of 164–167° C. This compound, verified by infra-red spectrum analysis, may be represented as follows:

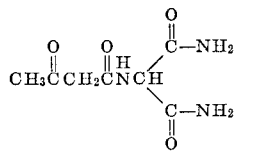

2-acetoacetamide propanediamide

Insofar as is known, no limitation is imposed on the selection of diazo compounds arising out of the use of the aliphatic acetoacet compounds embodying this invention. The following are examples of diazonium compounds which may be used with the acetoacet couplers embodying this invention to manufacture light sensitive diazo coating compositions:

4-N,N-diethylamino benzenediazonium chloride
4-N-methyl-N-hydroxyethylamino-benzenediazonium chloride
4-N,N-dimethylamino-benzenediazonium chloride
4-N-ethyl-N-hydroxyethylamino-benzenediazonium chloride
4-N-ethylamino-benzenediazonium chloride
4-N,N-diethylamino-2-methylbenzenediazonium chloride
4-N-morpholino-2,5-diethoxybenzenediazonium chloride
4-N,N-bis-(β-hydroxyethyl)-aminobenzenediazonium chloride
4-N-pyrrolidino-benzenediazonium chloride The following specific examples disclose diazo-sensitized formulations which may be employed to coat suitable base materials in making diazotype materials.

Example IV

A coating solution was prepared by mixing the following ingredients in the following proportions at room temperature:

Water—70 cc.
Ethylene glycol—1.5 cc.
Glycerine—5.0 cc.
Citric acid—4.0 g.
Thiourea—3.0 g.
1,3,6-naphthalene trisulfonic acid, sodium salt—1.0 g.
2-acetoacetamidoacetamide (from Example II)—1.8. g.
4-N,N-diethylamino benzenediazonium chloride—1.6 g.
Zinc chloride—4.0 g.

This mixture was then diluted to 100 cc. with water, and used to coat stock paper in the usual manner, employing a doctor blade to remove the excess solution. After drying the coated paper was exposed beneath an appropriate, partially opaqued original. Subsequent development in ammonia vapor produced a yellow dye image on a clear background.

Example V

Another coating solution was prepared by mixing the following proportions at room temperature:

Water—70 cc.
Ethylene glycol—1.5 cc.
Glycerine—5.0 cc.
Citric acid—4.0 g.
Thiourea—3.0 g.
1,3,6-naphthalene trisulfonic acid, sodium salt—1.0 g.
2,3-dihydroxy naphthalene-6-sulfonic acid—1.5 g.
2-acetoacetamidoacetamide (from Example II)—0.05 g.
4-N,N-diethylaminobenzenediazonium chloride—1.6 g.
Zinc chloride—4.0 g.

The mixture was diluted to 100 cc. with water and used to coat a stock paper in the usual manner, employing a doctor blade to remove the excess solution. After drying the coated paper was exposed beneath an appropriate, partially opaqued original. Subsequent development in ammonia vapor produced a black dye image on a clear background. Both the full density and continuous-tone areas were reproduced in a neutral black tone of uniform density.

The materials produced in Example IV and V were tested for shelf life by placing in an oven at 135° F. for three days. When removed no background discoloration was observed. In contrast a diazo formulation using acetoacetanilide as a coupler and another using the diacetoacetamide of ethylenediamine were both found to have background discoloration after only one day under similar conditions.

The work with the new acetoacetamido compounds has indicated that the usual diazo formulations can be used, except of course for the coupler constituent. Substitution acetoacet couplers embodying this invention for the usual usual aromatic or aliphatic acetoacetamido compounds produces diazo prints of high color saturation. The tendency to precouple which characterizes conventional couplers of this type has been greatly reduced. Another important aspect of this invention is that the reactivity of this new class of couplers can be closely matched to the coupling activity of other color couplers whereby the new couplers can be readily used in combination with other dyes. Moreover, solution of the precoupling problem permits use of higher concentrations of this new class of couplers in diazo formulations thereby resulting in the formation of dyes of greater intensity.

While the advantages of this invention are of particular significance in blackline diazo products, it is apparent that it relates to yellow, orange and other color products in which acetoacet couplers may be used since enhancement of self life is always an important consideration in the facsimile field.

The compounds, embodying this invention, may be applied to plastic layers in organic solvents as well as to paper in aqueous solvents in Examples IV and V.

We claim:

1. Acetoacet compounds having the general formula:

wherein $n$ is any integer from 1 to 2 and X is

where R is H or an alkyl group containing from 1 to 4 carbon atoms.

2. As a composition of matter 2-acetoacetamido propanediamine.

3. As a composition of matter 2-acetoacetamido acetamide.

4. As a composition of matter 2-acetoacetamido N'N'-diethylacetamide.

References Cited

UNITED STATES PATENTS 3,384,657  5/1968  Weissberger et al. ___ 260—507

ALEX MAZEL, Primary Examiner

R. V. RUSH, Assistant Examiner